United States Patent [19]
Rekhter

[11] Patent Number: 5,964,841
[45] Date of Patent: Oct. 12, 1999

[54] TECHNIQUE FOR HANDLING FORWARDING TRANSIENTS WITH LINK STATE ROUTING PROTOCOL

[75] Inventor: Yakov Rekhter, Putnam Valley, N.Y.

[73] Assignee: Cisco Technology, Inc., San Jose, Calif.

[21] Appl. No.: 08/810,083

[22] Filed: Mar. 3, 1997

[51] Int. Cl.$^6$ ............................ G06F 13/38; G06F 15/17
[52] U.S. Cl. ............................ 709/242; 370/255
[58] Field of Search ..................... 395/200.53, 200.68, 395/200.71, 200.72; 370/255; 709/223, 238, 241, 242

[56] References Cited

U.S. PATENT DOCUMENTS

| | | | |
|---|---|---|---|
| 5,088,032 | 2/1992 | Bosack | 395/200.72 |
| 5,265,092 | 11/1993 | Soloway et al. | 370/60 |
| 5,517,620 | 5/1996 | Hashimoto et al. | 395/200.72 |
| 5,557,745 | 9/1996 | Perlman et al. | 395/200.72 |
| 5,600,794 | 2/1997 | Callon | 395/200.71 |
| 5,754,790 | 5/1998 | France et al. | 395/200.68 |
| 5,790,808 | 8/1998 | Seaman | 295/200.53 |

FOREIGN PATENT DOCUMENTS 0 447 725 A2  9/1991  European Pat. Off. .

OTHER PUBLICATIONS

Richard Woundy, et al., ARIS: Internet–Draft "Aggregate Route–Based IP Switching", Nov. 1996, (31 pages).

Garcia–Luna–Aceves, et al., A Unified Approach to Loop–Free Routing Using Distance Vectors or Link States, Copyright 1989, pp. 212–223.

Radia Perlman, Interconnections Bridges and Routers, Addison–Wesley Professional Computing Series, Copyright 1992, pp. 205–231.

*Primary Examiner*—Mark H. Rinehart
*Attorney, Agent, or Firm*—Cesari and McKenna. LLP

[57] ABSTRACT

A detection technique detects inconsistencies in forwarding databases of a router and its neighbor, i.e., a next-hop router, during routing transients in a computer network. The technique enables the router to detect when its view of a computed path to a destination station is inconsistent with the view of its neighbor along that path. Upon detecting such an inconsistent state, the router invokes one of a plurality of forwarding mechanisms with respect to a packet intended for the destination station in an attempt to suppress forwarding loops that may arise during the transients.

15 Claims, 6 Drawing Sheets

FIG. 7A

TECHNIQUE FOR HANDLING FORWARDING TRANSIENTS WITH LINK STATE ROUTING PROTOCOL

FIELD OF THE INVENTION

This invention relates generally to computer networks and, more particularly, to the detection of routing transients in a computer network.

BACKGROUND OF THE INVENTION

Communication in a computer network involves the exchange of data between two or more entities interconnected by communication links and subnetworks. These entities are typically software programs executing on hardware computer platforms, such as end stations and intermediate stations. An example of an intermediate station may be a switch or router which interconnects the communication links and subnetworks to enable transmission of data between the end stations. The stations typically communicate by exchanging discrete packets or frames of data according to predefined protocols. In this context, a protocol consists of a set of rules defining how the stations interact with each other.

Most networks are typically organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

Figure 1:
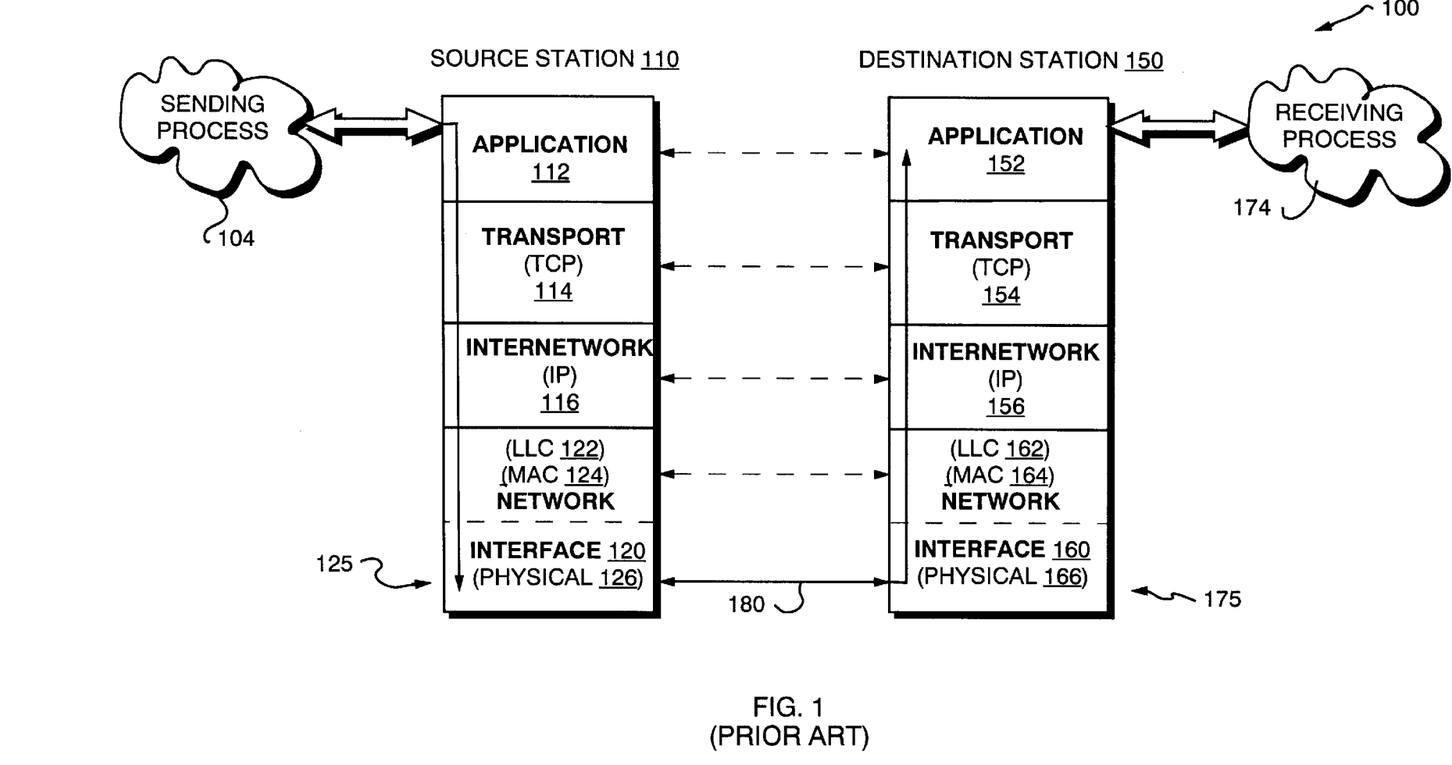
FIG. 1 is a schematic block diagram of prior art protocol stacks used to transmit data between stations of a computer network.

Modern communications architectures are organized as such layered designs. The Internet communications architecture is an example of a layered architecture represented by four layers which are termed, in ascending interfacing order, the network interface, internetwork, transport and application layers. These layers are arranged to form a protocol stack in each communicating node of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The transport layer 114 serves as the boundary between the network-specific elements and the application-specific elements. The transport layer's fundamental service is to move a user's data from its source to its destination over a communication path using the internetwork subsystem. The application layer 112 provides services suitable for the different types of applications using the network.

The lower network interface layer 120 of the Internet architecture addresses protocols that occupy physical and datalink sublayers of layer 120. The physical layer 126 is concerned with the actual transmission of signals across the communication channel and the datalink layer is responsible for transmission of data from one station to another. The primary network layer protocol of the Internet architecture is the Internet protocol (IP) contained within the internetwork layer 116. IP is primarily a connectionless network protocol that relies on transport protocols for end-to-end reliability. An example of such a reliable transport mechanism is the transmission control protocol (TCP) contained within the transport layer 114.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of the stack 175 until it arrives at the receiving process.

As noted, each layer of the protocol stack offers selected services to other layers; one such service is a connectionless service. This network service is generally implemented by a network layer protocol, an aspect of which involves the routing of packets from the source station to the destination station. In particular, this aspect of the internetwork layer concerns the algorithms and protocols used by routers when cooperating to calculate paths through a network topology. A routing algorithm is that portion of the network layer software responsible for determining an output communication link (i.e., an egress) over which an incoming packet should be transmitted. An example of a conventional routing algorithm is the Dijkstra algorithm and an example of a conventional network layer routing protocol is a link state routing protocol.

According to this latter protocol, each router constructs a link state packet (LSP) comprising information, such as a list of neighboring nodes adjacent to the router, sufficient to generate a complete map of the topology of the network. As defined herein, the term "neighbor" denotes a neighboring router. The LSP is then forwarded to all other routers of the network over, e.g., a plurality of interconnected local area networks (LANs). Each of these other routers stores only the most recently received LSP from the forwarding router in its LSP database. Armed with updated maps, the routers may compute shortest paths to destination stations using a conventional routing algorithm; the computed paths are then stored in forwarding tables of the routers. Examples of link state routing protocols are the intermediate system to intermediate system (IS—IS) protocol defined by the International Standards Organization (ISO), the open shortest path first (OSPF) protocol defined by the Internet protocol (IP) community and the NetWare link services protocol (NLSP) defined by Novell, Inc.

Use of link state routing in conjunction with hop-by-hop forwarding may result in formation of transient (i.e., temporary) forwarding loops. Routing transients typically arise when there is a change in the topology of a network. For example in response to a network topology change, each router updates its routing information and re-calculates shortest paths between the router and a destination station. This newly updated information is then transmitted to the other routers in the network. While the other routers propagate the updated information throughout the network and re-calculate their forwarding tables, there is a possibility that routers possessing inconsistent routing information may forward packets back to a previous sender of the packets, thus creating forwarding loops. The present invention is directed to an approach that enables detection of the occurrence of forwarding loops.

Conventional link state routing protocols, such as OSPF and IS—IS, generally do not provide mechanisms for suppressing such forwarding loops during routing transients. In order to limit the amount of network resources consumed by such transient forwarding loops, each packet may carry hop-count (e.g., time-to-live) information in a conventional network layer header of the packet. When a router forwards the packet, it decrements the hop-count information and when a router receives the packet with the hop-count information equal to zero, it discards the packet.

An approach that enables limiting of the amount of networking resources consumed by transient forwarding loops without relying on each router to decrement hop-count information is described in an Internet-Draft publication titled *ARIS: Aggregate Route-Based IP Switching* by Richard Woundy et al. of International Business Machines Corp, November 1996. This publication discloses a mechanism which uses conventional link state routing protocols as the basis for switching IP datagrams by the addition of the ARIS protocol that establishes switched paths through a network. The ARIS protocol guarantees that asynchronous transfer mode (ATM) virtual circuit (VC) loops are prevented even in the presence of transient IP routing loops by using an integrated switch router (ISR) identification ("ISR ID") list.

Specifically, each ISR in a VC establishment path appends its own unique ISR ID to each establishment message it forwards. In this way, an ISR is able to determine the path a message has traversed and can ensure that no loops are formed. Further, if an ISR modifies or deletes an egress due to an IP route change, the ISR must unsplice any established upstream VC from the downstream VC. Such unsplicing forces inbound traffic to be forwarded at the IP network layer so that transient IP routing loops cannot produce VC loops.

Another approach directed to solving the problem of suppressing forwarding loops during routing transients is described in U.S. Pat. No. 5,265,092, titled *Synchronization Mechanism for Link State Packet Routing* by Stuart R. Soloway et al. This patent discloses a method of providing loop free and shortest path routing of data packets in a network of switches through modifications to known LSP routing protocols.

Specifically, a switch uses a received LSP to compute a forwarding table and informs neighboring switches of a routing change. The switch discards subsequent packets whose path would be affected by the routing change. Discarding of packets continues until the switch receives notification from each adjacent switch affected by the routing change that all affected routing paths have been re-calculated and the forwarding table of each affected switch has been updated. While adjacent switches may temporarily contain inconsistent LSP databases and possibly inconsistent forwarding tables, looping of data packets is prevented. Thus, the objective of Soloway is to essentially synchronize LSP databases across the network and data packets are discarded until that objective is achieved.

The mechanism in Soloway by which a switch informs the neighboring switches of the routing change, and by which the switch receives notification of those switches' affected by the routing change, is a Ready Announcement. The Ready Announcement is substantially a LSP that is modified to include an announcement bit which, when asserted true, indicates to all receivers that the Ready Announcement has been used to re-compute a forwarding table of the sending switch. Distribution of a modified LSP over the network results in relatively "slow" convergence of the patent's objective; that is, processing of the Ready Announcement consumes substantial time and overhead to determine inconsistencies of LSP databases.

SUMMARY OF THE INVENTION

The invention comprises a technique for efficiently detecting inconsistencies in forwarding databases of a router and its neighbor during routing transients in a computer network. Specifically, the technique enables the router to detect when its view of a computed path to a destination station is inconsistent (in a way that may indicate potential transient forwarding loops) with the view of its neighbor along that path. Upon detecting such an inconsistent state, the router invokes one of a plurality of forwarding mechanisms with respect to a packet intended for the destination station to either suppress forwarding loops that may arise during the transients or to limit the amount of network resources such loops may consume.

In the illustrative embodiment, the novel detection technique comprises a control component and a forwarding component. During execution of the control component, each of the router and neighbor compute a shortest path and hop-count parameter to the destination, and store the computed path and parameter in their respective augmented forwarding information databases (FIB'). Upon detecting a change in the hop-count parameter stored in the FIB', the neighbor sends an update message to all of its neighbors, including the router that views the neighbor as its next-hop (NH) neighbor with respect to the destination. In accordance with an aspect of the present invention, the update message contains a tuple comprising an address prefix associated with the computed path to the destination station and the hop-count parameter associated with that path to the destination. Notably, the hop-count parameter contained in the update message is a value representing the number of routers between the router originating the message and the last router within the same routing hierarchy (e.g., OSPF area) as the originating router along the computed path to the destination station (where the path is determined by the originating router).

In response to receiving the update message from its NH neighbor, the router (i) either discards all packets intended for the destination that are queued for transmission to the NH neighbor, or decrements a time-to-live or lifetime entry of an conventional network layer header of each packet and (ii) returns an acknowledgement message comprising the same tuple contained in the update message. The router then compares the NH view of the computed path, i.e., the hop-count value contained in the update message received from the NH neighbor, with its own view, i.e., the hop-count value contained in its FIB'. In accordance with another aspect of the invention, if the hop-count value in the update message is less than the FIB' hop-count value, the router's view of the path is consistent with the NH neighbor's view and the packet may be sent to the destination station.

On the other hand, if the update message hop-count value is not less than the FIB' hop-count value, the router's view of the computed path is inconsistent with its NH neighbor's view. As a result, the forwarding component of the detection technique is invoked. According to this aspect of the invention, the packet may be discarded by the router or, alternatively, forwarded along the path but only after decrementing the time-to-live or lifetime entry of the conventional network layer header of the packet. These alternatives are invoked by the router for as long as the database inconsistency persists, thus avoiding persistent looping during the transients.

Advantageously, the inventive technique either completely eliminates or contains the amount of looping that occurs during routing transients. In addition, the invention may operate in an environment where decrementing time-to-live (hop-count) on every packet may be undesirable or infeasible.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 2:
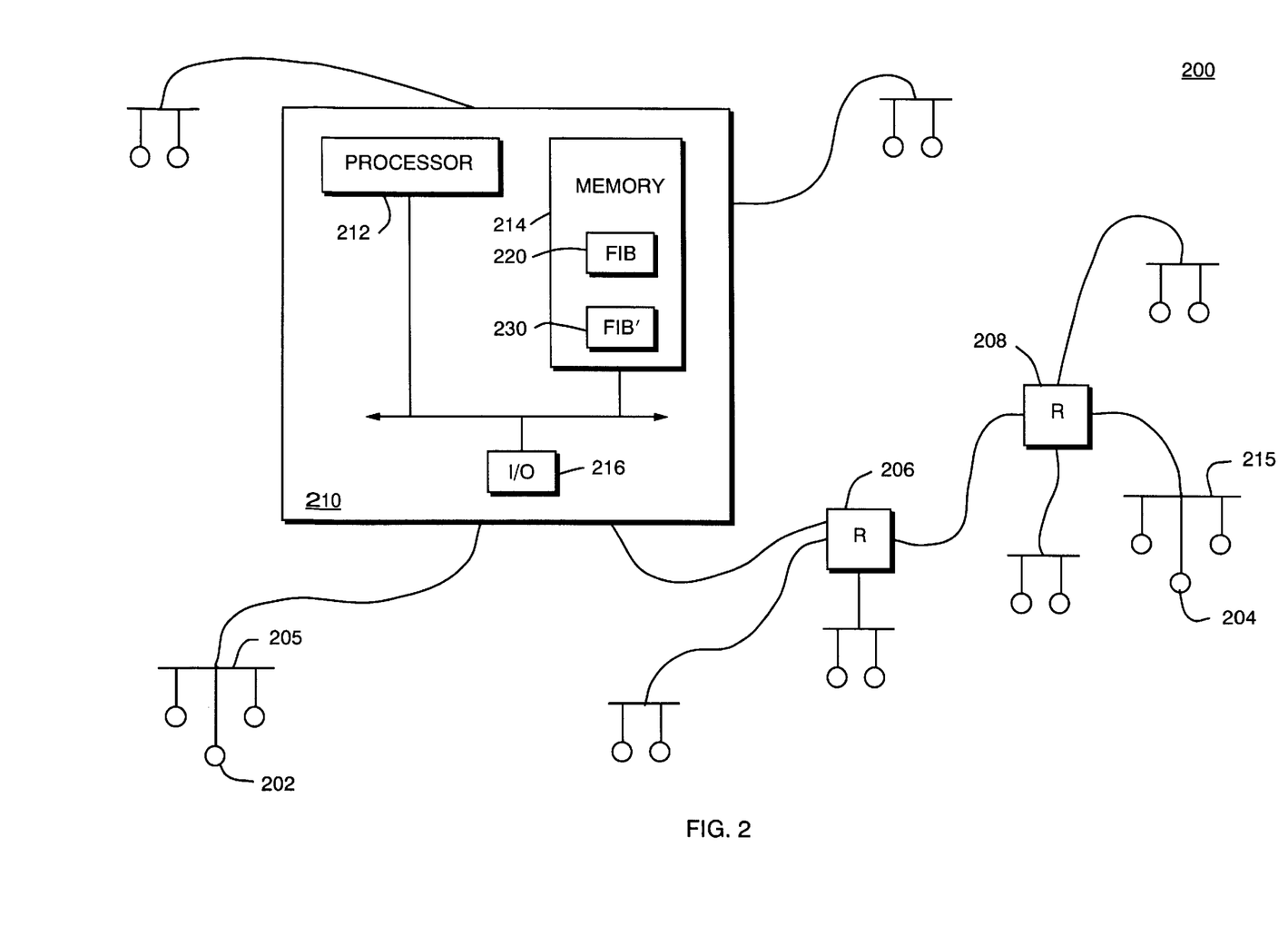
FIG. 2 is a block diagram of a network system including a collection of computer networks connected to a plurality of stations.

FIG. 2 is a block diagram of a network system 200 comprising a collection of computer networks connected to a plurality of stations. The stations are typically computers comprising source station 202, destination station 204 and intermediate stations 206–210, which are preferably routers (R). The computer networks included within system 200 are preferably local area networks (LANs) interconnected by the routers, although the networks may comprise other communication links, such as wide area networks. Communication among the stations coupled to the LANs is typically effected by exchanging discrete data "packets" among the stations. The routers facilitate the flow of these data packets throughout the system by routing the packets to the proper receiving stations.

Each router typically comprises a plurality of interconnected elements, such as a processor 212, a memory 214 and an input/output (I/O) adapter 216. The memory 214 may comprise storage locations addressable by the processor and adapter for storing software programs and data structures associated with the inventive detection technique. The memory may be further organized as a forwarding information database (FIB) 220 for storing routing information and computed parameters described herein although, in an alternate embodiment, a disk (not shown) may be coupled to the I/O adapter and configured to function as the database.

The processor may further comprise processing elements or logic for executing the software programs and manipulating the data structures and packets according to the techniques described herein. An operating system, portions of which are typically resident in memory and executed by the processor, functionally organizes the router by, inter alia, invoking network operations in support of software processes executing on the router. It will be apparent to those skilled in the art that other processor and memory means, including various computer readable media, may be used for storing and executing program instructions pertaining to the described techniques.

In general, when source station 202 transmits a packet over a LAN, such as LAN 205, the packet is sent to all stations on that LAN. If the intended recipient of the packet is connected to LAN 215, the packet is routed through routers 206–210 onto LAN 215. Typically, the packet contains two destination addresses: the address of the final destination station 204 and the address of the next station along the route. The final destination address remains constant as the packet traverses the networks, while the next destination address changes as the packet moves from station to station along the route through the networks.

A key function of a router is determining the next station to which the packet is sent; this routing function is preferably performed by network layer (such as internetwork layer 116 of FIG. 1) of a protocol stack within each station. This aspect of the network layer concerns the algorithms and protocols used by routers when cooperating to calculate paths through a network topology. The routers typically execute routing algorithms to decide over which communication links incoming packets should be transmitted.

A type of network layer routing protocol commonly employed by routers is a link state routing protocol. However, conventional link state routing algorithms in conjunction with hop-by-hop forwarding do not generally prevent the creation of temporary forwarding loops during routing transients in a network. In particular, there is a possibility that routers possessing inconsistent routing information in their forwarding databases may forward packets back to a previous sender of the packets during routing transients, thus creating forwarding loops.

In accordance with the present invention, a technique is provided for detecting inconsistencies in FIBs of a router (such router 210) and its neighbor 206 during routing transients in a computer network. As described herein, the neighbor 206 is preferably a next-hop (H) neighbor as viewed by the router 210 with respect to a particular destination, such as destination station 204. The inventive technique enables the router 210 to detect when its view of a computed path to destination station 204 is inconsistent with the view of its NH neighbor 206 along that path. Upon detecting such an inconsistent state, the router invokes one of a plurality of forwarding mechanisms with respect to a packet intended for the destination station in an attempt to either suppress forwarding loops that may arise during the transients or limit the amount of resources such loops consume.

Figure 3:
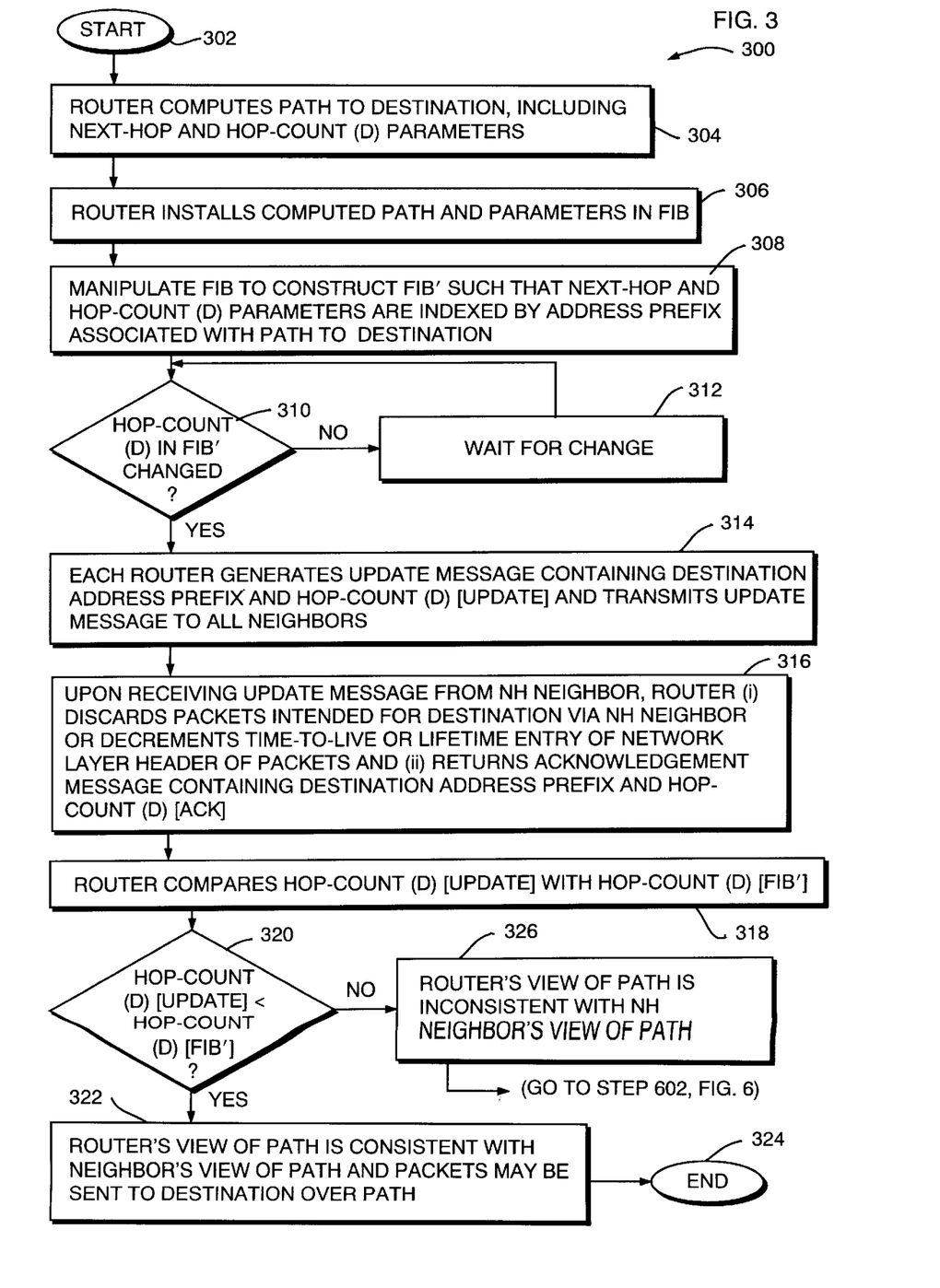
FIG. 3 is a flowchart illustrating a control sequence of a novel detection technique in accordance with the invention.
Figure 6:
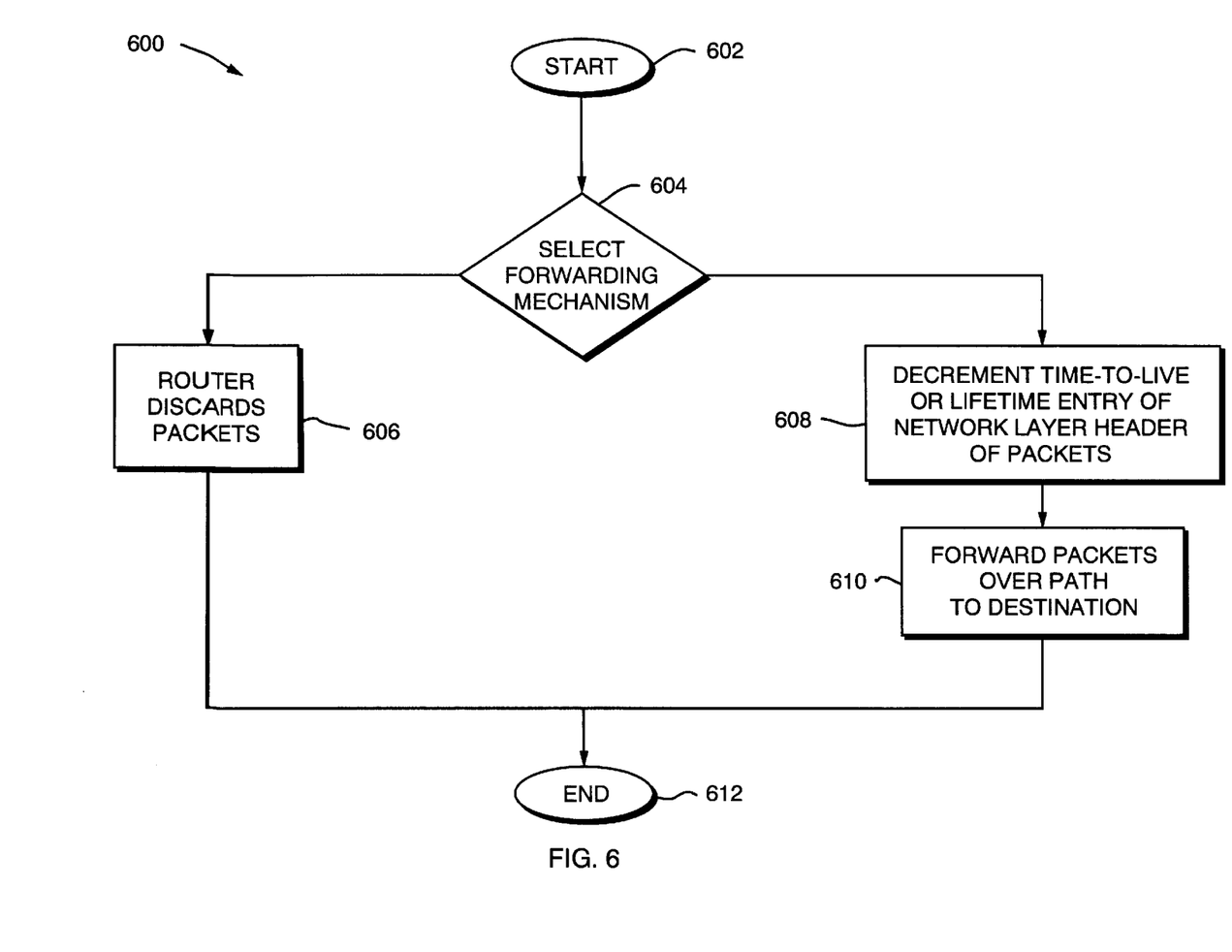
FIG. 6 is a flowchart illustrating a forwarding sequence of the novel detection technique according to the invention.

FIGS. 3 and 6 are flowcharts illustrating the sequence of steps comprising the novel detection technique. In the illustrative embodiment, the technique is embodied as a network layer protocol comprising a control mechanism component 300 and a forwarding mechanism component 600. The control mechanism is based on the ability of each router to compute the shortest path and/or number of hops to a destination station when executing a link state algorithm.

Referring to FIG. 3, the control mechanism sequence 300 starts at Step 302 and proceeds to Step 304 where each router computes a shortest path (route) to the destination 204 by executing a routing algorithm, such as the conventional Dijkstra algorithm. By-products of the Dijkstra algorithm include determinations of parameters such as the next hop, i.e., intermediate router, and the hop-count to the destination, i.e., hop-count (D). In Step 306, the routers install the computed path, together with these parameters, in their FIBs 220.

Each router then constructs an "augmented" FIB (denoted FIB' 230 in FIG. 2) by manipulating the contents of the FIB 220 to include the next-hop and hop-count (D) parameters (Step 308); these parameters are preferably stored in the FIB' at a location referenced by an address prefix associated with the path to the destination. The address prefix is that portion of the destination address typically used by network layer protocols performing routing functions (at the same routing level of a network) to make next-hop determinations. The routing information exchanged by (peer) routers typically includes this destination address prefix, although other encoding methods for a set of reachable destinations could be used as well (e.g., explicit enumeration or ranges).

In Step 310, each router checks the FIB' to determine whether there is a change that affects the hop-count (D) parameter. Although the hop-count typically changes as a result of a change in network topology, not all changes in topology result in a change in hop-count. If there is no change affecting the hop-count (D), each router waits for a change in Step 312 and the sequence loops-back to Step 310; otherwise, if there is a change to the parameter, that router, e.g., NH neighbor 206, generates an update message in Step 314 and transmits that message to all of its neighbors, including router 210.

Figure 4:
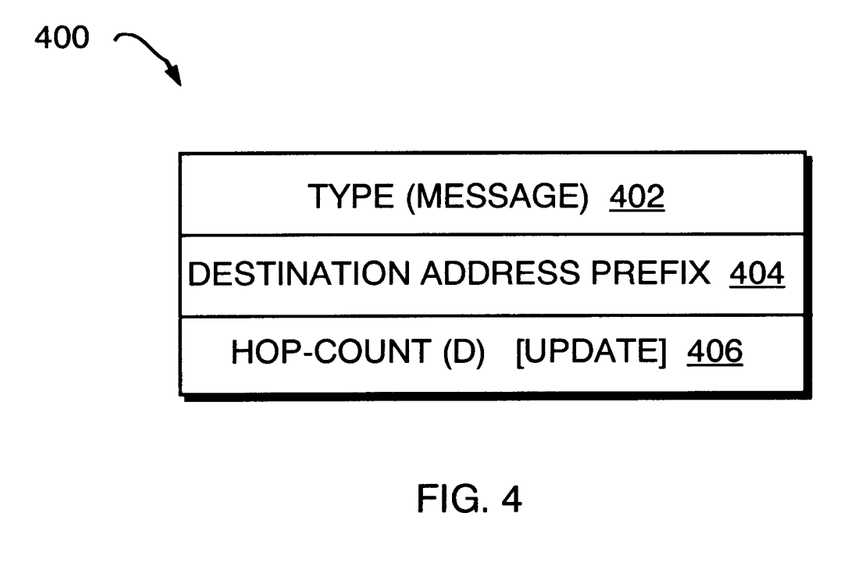
FIG. 4 is a schematic diagram of an update message in accordance with the invention.

FIG. 4 is a schematic diagram of the format of the update message 400 comprising a type field 402 identifying the type of message, an address field 404 of the destination station and a hop-count field 406. Specifically, the latter two fields contain a tuple comprising an address prefix of the destination station (in field 404) and a hop-count (D) [UPDATE] value (in field 406). The hop-count (D) [UPDATE] value in field 406 of the update message 400 represents the number of routers between the router originating the message and the last router within the same routing hierarchy (e.g., OSPF area) as the originating router along the computed path to the destination station (where the path is determined by the originating router).

Upon receiving the update message 400 from the NH neighbor 206, the router 210 (i) either discards all packets intended for the destination that are queued for transmission to the NH neighbor 206, or decrements a time-to-live or lifetime entry of an conventional network layer header of each packet and (ii) acknowledges receipt of the update message by returning an acknowledgement message to the NH neighbor 206 in Step 316. It should be noted that the protocol for exchanging update and acknowledgement messages described herein is built upon a reliable transport mechanism, such as TCP, to ensure reliable exchanges between the router and its neighbor.

Figure 5:
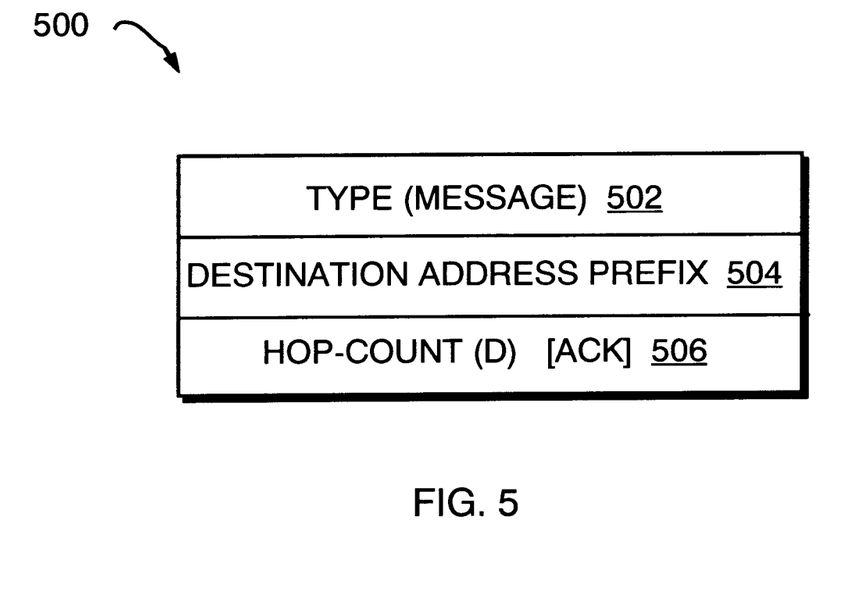
FIG. 5 is a schematic diagram of an acknowledgement message in accordance with the invention.

FIG. 5 is a schematic block diagram of the format of the acknowledgement message 500 which is substantially similar to the update message 400. That is, the acknowledgement message 500 comprises a type field 502 identifying the type of message, an address field 504 containing the address prefix of the destination station and a hop-count field 506. The contents of the hop-count field 506 comprise a hop-count (D) [ACK] value that is identical to the hop-count (D) [UPDATE] value stored in field 406.

The router 210 then compares the NH view of the computed path, i.e., the hop-count (D) [UPDATE] value contained in the NH neighbor's update message, with its own view, i.e., the hop-count (D) [FIB'] value contained in its FIB', in Step 318. In accordance with another aspect of the invention, a determination is made as to whether the hop-count (D) [UPDATE] value is less than the hop-count (D) [FIB'] value in Step 320. If so, the router's view of the path is consistent with the NH neighbor's view and the packet may be sent over the path to the destination station in Step 322; the sequence then ends in Step 324. On the other hand, if the update hop-count value (D) is not less than the FIB' hop-count (D) value (Step 320), the router's view of the computed path is inconsistent with its NH neighbor's view (Step 326) and the forwarding component sequence of the detection technique is invoked.

Referring to FIG. 6, the forwarding sequence 600 starts at Step 602 and proceeds to Step 604 where a forwarding mechanism is selected. Specifically, the packet may be discarded by the router in Step 606; this forces the sender to retransmit the packet because of the underlying reliable transport mechanism. Alternatively, the packet may be forwarded over the path to the destination in Step 610 but only after decrementing a time-to-live or lifetime entry of a conventional network layer header of the packet (Step 608). In either case, the sequence then ends in Step 612. These alternative forwarding mechanisms are preferably invoked by the router for as long as the database inconsistency persists, thus avoiding persistent looping during the transients.

Figure 7A:
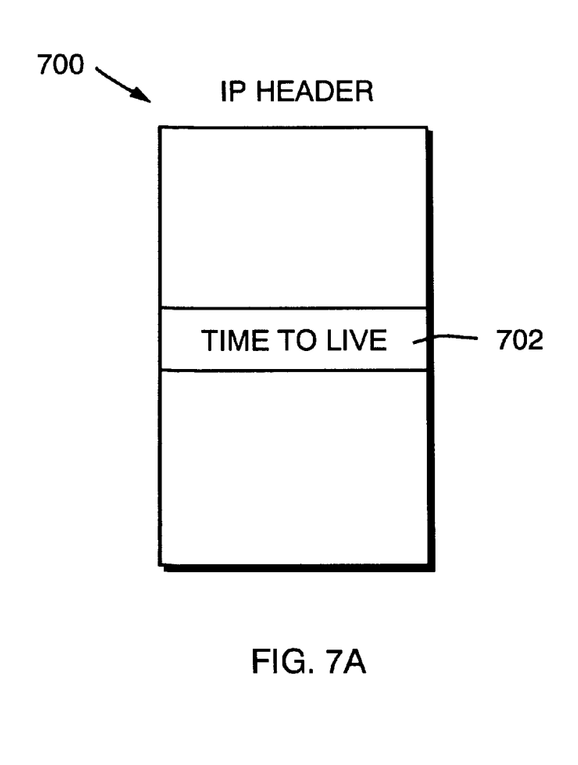
FIGS. 7A and 7B are schematic block diagrams of conventional network layer headers that may operate advantageously with the present invention.
Figure 7B:
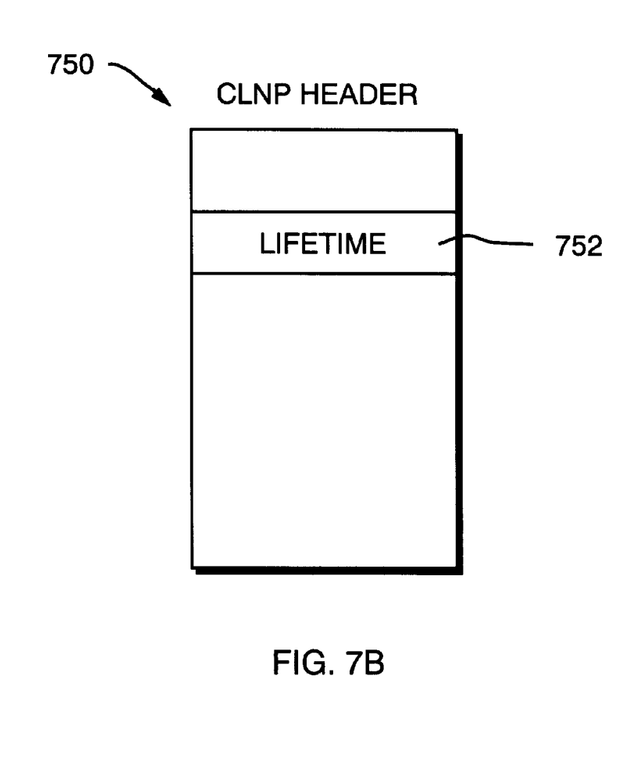

FIGS. 7A–7B are schematic block diagrams of conventional network layer headers that may operate advantageously with the present invention. Specifically, FIG. 7A is a diagram of the Internet protocol (IP) network layer header 700 having a time-to-live field 702 and FIG. 7B is a diagram of the connectionless network layer protocol (CLNP) header 750 having a lifetime field 752. In yet another alternate embodiment, the network layer header may comprise the Internet Packet Exchange (IPX) protocol header having a field similar to the time-to-live field 702. The contents of the fields 702 and 752 are modifiable by the routers; in particular, the contents of these fields are typically set to some initial value by the source station and are thereafter decremented by the routers until they reach zero (0), at which point the packet is discarded. Thus if the packet is caught in a forwarding loop encompassing the routers, the packet will eventually be discarded to suppress the loop.

It should be noted that the router 210 is considered in a transient state (from the point of view of the NH neighbor 206 and destination 204) from the moment at which the NH neighbor 206 installs a new path to the destination in its FIB until the NH neighbor 206 receives and processes an acknowledgement from the router 210 indicating that the update message was received and processed. If the NH neighbor 206 changes its path to the destination station 204, the neighbor discards all packets destined to the destination or decrements a time-to-live or lifetime entry of a network layer header if the packets were received from the router 210 when in a transient state.

When implementing the novel technique it is assumed that there is no re-ordering of packets at the datalink layer of the protocol stack. Moreover, the inventive technique does not ensure that packets do not traverse through a non-shortest path route; the technique only constrains the length (hop-count) of such a route.

An advantage of the inventive technique is that it enables limiting of the amount of resources that could be consumed during routing transients without requiring decrementing time-to-live (hop-count) on every packet. The invention may further operate in an environment where decrementing time-to-live (hop-count) may be undesirable or infeasible.

While there has been shown and described an illustrative embodiment for efficiently detecting inconsistencies in forwarding databases of a router and its NH neighbor during routing transients in a computer network, it is to be understood that various other adaptations and modifications may be made within the spirit and scope of the invention. For example in an alternate embodiment of the invention, the hop-count parameter contained in the novel update and acknowledgement messages may be substituted with an entire path parameter. Here, the entire path parameter, i.e., path (D), is also a by-product of the Dijkstra algorithm and includes identification (ID) of all routers in the computed path between the either the router and destination or the neighbor and destination.

Furthermore, the comparison operation of Step 318 (FIG. 3) for this alternate embodiment comprises the router 210 comparing the path (D) contents contained in the update message with the path (D) contents contained in its FIB'. A determination is then made as to whether the path (D) of the FIB' is equal to the path (D) of the update message minus the NH neighbor's ID in Step 320. If so, the router's view of the path is consistent with the NH neighbor's view and the packet may be sent to the destination station in Step 322. Otherwise, the views are inconsistent (Step 324) and the forwarding component sequence 600 (FIG. 6) is invoked.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently detecting inconsistencies in forwarding databases of a router and its next-hop (NH) neighbor during routing transients in a computer network, the method comprising the steps of:

computing a path and a first hop-count parameter to a destination station (hop-count (D)) at the router and computing a second hop-count (D) at the NH neighbor;

transmitting an update message from the NH neighbor to the router when the second hop-count (D) changes, the update message containing an address of the destination station and the second hop-count (D) associated with that address;

comparing the second hop-count (D) with the first hop-count (D); and detecting inconsistencies in the forwarding databases of the router and NH neighbor if the second hop-count (D) is not less than the first hop-count (D).

2. The method of claim 1 further comprising the step of invoking one of a plurality of forwarding options with respect to a packet received at the router and intended for the destination station to suppress forwarding loops during the routing transients.

3. The method of claim 2 wherein the step of invoking one of the forwarding options comprises the step of discarding the packet.

4. The method of claim 2 wherein the step of invoking one of the forwarding options comprises the steps of:

decrementing one of a time-to-live and lifetime entry of a network layer header of the packet; and forwarding the packet to the destination station over the computed path.

5. The method of claim 1 further comprising the steps of:

constructing augmented forwarding databases at the router and the NH neighbor; and storing the first hop-count (D) in the router's augmented forwarding database and the second hop-count (D) in the NH neighbor's augmented forwarding database.

6. Apparatus for detecting inconsistencies in views of paths to a destination station of a computer network, the apparatus comprising:

a router coupled to the network, the router having a processing element for processing routing information to compute a path and first hop-count parameter from the router to the destination station;

a neighboring router coupled to the router via the network, the neighboring router having a processing element for processing routing information to compute a path and second hop-count parameter from the neighboring router to the destination;

means, coupled to the router, for executing a control mechanism to determine whether the second hop-count parameter is less than the first hop-count parameter; and means, coupled to the router, for invoking a forwarding mechanism with respect to a packet intended for the destination station if the second hop-count parameter is not less than the first hop-count parameter.

7. The apparatus of claim 6 wherein the means for executing the control mechanism further comprises means for comparing the first hop-count parameter with the second hop-count parameter.

8. The apparatus of claim 7 further comprising an augmented forwarding database coupled to the router for storing the first hop-count parameter.

9. The apparatus of claim 8 wherein the means for invoking the forwarding mechanism comprises means for discarding the packet.

10. The apparatus of claim 8 wherein the means for invoking the forwarding mechanism comprises:

means for decrementing one of a time-to-live and lifetime entry of a network layer header of the packet; and means for forwarding the packet to the destination station over the computed path.

11. A computer readable medium containing executable program instructions for efficiently detecting inconsistencies in forwarding databases of a router and its neighbor during routing transients in a computer network, the executable program instructions comprising program instructions for:

computing a path and a first hop-count parameter to a destination station (hop-count (D)) at the router and a second hop-count (D) at the neighbor;

transmitting an update message from the neighbor to the router when the second hop-count (D) changes, the update message containing an address of the destination station and the second hop-count (D) associated with that address;

comparing the second hop-count (D) with the first hop-count (D); and detecting inconsistencies in the forwarding databases of the router and neighbor if the second hop-count (D) is not less than the first hop-count (D).

12. The medium of claim 11 further comprising program instructions for invoking one of a plurality of forwarding options with respect to a packet received at the router and intended for the destination station to suppress forwarding loops during the routing transients.

13. The medium of claim 12 wherein the program instructions for invoking one of the forwarding options comprises program instructions for discarding the packet.

14. The medium of claim 12 wherein the program instructions for invoking one of the forwarding options comprises program instructions for:

decrementing one of a time-to-live and lifetime entry of a network layer header of the packet; and forwarding the packet to the destination station over the computed path.

15. The medium of claim 11 further comprising program instructions for:

constructing augmented forwarding databases at the router and the neighbor; and storing the first hop-count (D) in the router's augmented forwarding database and the second hop-count (D) in the neighbor's augmented forwarding database.

* * * * *